Jan. 8, 1957

E. R. FREY 2,776,615

WIRE TYING MECHANISM

Filed Dec. 26, 1952

INVENTOR.
Eli R. Frey
BY Warren H. F. Schmieding

HIS ATTORNEY

Jan. 8, 1957  E. R. FREY  2,776,615
WIRE TYING MECHANISM
Filed Dec. 26, 1952  8 Sheets-Sheet 2

INVENTOR.
Eli R. Frey
BY Warren H. F. Schmieding
HIS ATTORNEY.

INVENTOR.
ELI. R. FREY

Jan. 8, 1957  E. R. FREY  2,776,615
WIRE TYING MECHANISM
Filed Dec. 26, 1952  8 Sheets-Sheet 8

INVENTOR.
Eli R. Frey
BY Warren H. F. Schmieding
HIS ATTORNEY

United States Patent Office 2,776,615
Patented Jan. 8, 1957

2,776,615

WIRE TYING MECHANISM

Eli R. Frey, West Jefferson, Ohio

Application December 26, 1952, Serial No. 328,055

27 Claims. (Cl. 100—2)

The present invention relates generally to wire tying mechanism, with particular reference to mechanism of the type used on agricultural baling presses for hay, straw, or the like.

Having seen the need for a better and more simple mechanism for tying wire strands around bales of hay, straw or similar material for use in conjunction with a baling press, I have invented the mechanism herein disclosed which functions in a novel way and which produces a better joint for wires. My aim has been to achieve the most practical connection of two wires. Such connection should have the following requirements. It must be as strong or stronger than the wire from which it is formed. Since the bales are handled manually from either the side or the end, the wire joints should be at a corner of the bale so that the person handling the bale will not come in contact with it and possibly injure himself. The mechanism disclosed herein, has these advantages, and furthermore, it produces a tie which has no sharp projections which might injure a person since such tie consists of two loops twisted together thereby eliminating any projecting wire ends. This tie has a further advantage in that it may be opened with the hand alone by merely grasping the two loops and untwisting them.

In addition to the advantages of the wire joints produced, the mechanism itself has numerous advantages. It may be entirely enclosed in a case and at the same time occupy a minimum of space due to its compactness. The mechanism is therefore protected against chafe and dirt which are so prevalent on baling presses. At the same time, the vital parts are protected against rust and corrosion to which baling machines are subjected since they are frequently left outside.

The mechanism is more simple in operating principle and it has no critical settings to maintain other than those which are permanently built into the structure. This of course provides simplicity in maintenance. I have eliminated the need for a holding or clamping device such as has been utilized in the prior art to hold a loose end of wire. As such holding or clamping devices are subject to rapid wear, frequent replacement of such parts has been an objectionable characteristic in the prior art structure. A novel advantage in my structure resides in the provision of two rotatable wire twisting hooks mounted on a head which is itself rotatable about an axis intermediate the hooks. With such arrangement the end of a baling wire is initially secured to one of the hooks and then passed around the material to be baled. Suitable wire carrying means is then moved towards the head and a portion of the wire is placed through the hook so it extends continuously therethrough. The hook nearest the bale will then contain the loop wire end and also the wire strand proper. The far hook will contain only the wire strand proper. Both the hooks are then rotated about their respective axis. The near hook containing both the looped wire end and a portion of the wire strand proper will now be carrying two loops which are mutually twisted together to form a joint for the portion of the wire which passes around the bale. The far hook, which contains only the wire strand proper, will now contain a single loop due to the twisting action of the hook. Suitable cutter means is next utilized for cutting the wire strand proper at a point intermediate the two hooks. After the strand is cut, the hook nearest the bale will still contain the double loop wire joint and the hook farthest from the bale will contain only a looped end of the wire strand proper which strand extends from the source of wire to such hook.

It is now necessary to drop the looped wire joint from the hook carrying the same and to bring the far hook containing the single loop to a hook position nearest the bale so that the hooks and wire disposition will be the same as it was at the commencement of the cycle for the first bale. To accomplish this movement of the hooks, and the opening of one of them, I mount such hooks on a rotatable head and rotate the head through 180° so that the hooks exchange positions. At the same time, I provide hook opening means responsive to rotation of the head for opening the hook containing the double loop wire joint. The opened hook is then moved, by rotation of the head upon which it is mounted, away from the double loop wire joint, dropping same as it rotates around to its 180° position. At the same time, the other hook, which is carrying the looped end of the wire coming from the wire source, is moved around to the hook position nearest the bale. The hooks and the wire strand proper are now in position for tying the next bale.

Another novel feature of my invention resides in the wire cutting means positioned between the wire twisting hooks with such cutting means being extendible and retractable relative to the hooks. The cutting means is thereby made retractable to clear the path for a wire carrying member when the hooks are being loaded by such member. The cutting means also serves, when it is extended after the hooks are loaded with the wire strand, to hold the wire in configuration suitable for being twisted by the wire twisting hooks. A further advantage of the cutting means lies in its particular structure wherein a central cutter is surrounded by a housing which is adapted to grasp the wire and move it against the centrally contained cutter. To effect cutting of the wire, I mount the housing rotatable with the head and rotatable relative to the centrally contained cutter.

My wire carrier means provides novel advantages in that it is formed with a yieldable end portion which is adapted to yield to the side of a normal path for such wire carrier means as the means approaches the wire twisting hooks. In this manner the wire carried by the yieldable end portion is caused to enter the hooks through spring pressed latches which are formed in a hook portion eccentric to the axis of rotation of the hooks. After the wire has been placed through the latch and into the hooks, and as the wire carrier portion is retracted away from the hooks, the yieldable end portion thereon will yield back into the normal path so that the wire will be pulled taut along the axis of rotation of the hook with the wire engaging the hooks at the central portion thereon which portion is disposed along the axis of rotation. It is desirable to have the wire aligned with the axis of rotation of the wire twisting hooks, so that effective twisting of the wire into loops can be accomplished.

Another novel feature resides in my bale length gauge wheel. My gauge wheel is located in the structure so that it will be movably disposed in the path of the material being baled as such material is compacted into a baling chamber by a plunger. I provide novel teeth extending radially from the wheel with such teeth curving, as they extend outwardly, in a direction opposite to the direction of rotation of the wheel. With this curved tooth construction, the teeth are disposed so as to piercingly engage the material being compacted into a bale and the teeth are also adapted to move away from contact with the material being baled without objectionable tearing action which was the case with the non-curved teeth used in structures of the prior art. In addition, I provide novel adjustable mounting means for my bale length gauge wheel so that such wheel can be moved towards or away from the baling chamber. With such adjustable mounting the depth to which the teeth on the gauging wheel pierce into the material being baled can be varied to correspondingly vary the effective diameter of the wheel. By utilizing this adjustment the length of the bale being formed can be readily controlled.

Additional features of my invention reside in my novel clutch release mechanism which embodies novel structure for effecting engagement of the clutch at a predetermined time with said structure being automatically resettable between cycles of the tying mechanism. In addition, I utilize novel means for connecting the driving portions and the driven portion of the clutch.

Further advantages of my invention reside in novel structure for rotating the wire twisting hooks and for rotating the head upon which such hooks are mounted.

Still another feature of my invention resides in the novel wire tucking means, which means is disposed between one of the wire twisting hooks and the bale. The wire tucking means is movable transverse to the path of the wire extending from the twisting hook to the bale. Such wire tucking means is provided with a finger engageable with the wire for shifting the wire in a direction transverse to its path. Hence the wire is shifted away from the path of the wire carrier means. The wire carrier means can therefore be extended to engage the wire twisting hooks without encountering interference from the wire portion which extends from the wire twisting hook to the bale.

The mechanism of my invention also includes wire twisting hooks of novel structure which are adapted to be opened and closed for releasing loops of wire twisted thereon. Novel means are also provided for actuating the openable and closable hooks at certain predetermined position of rotation of the head.

I also provide, in my wire tying mechanism, novel retracting apparatus for the wire cutting means with such apparatus also being adapted to extend and retract a wire carrying member. The apparatus serves to retract the wire cutting means when the wire carrying member is extended to the hooks for placing a wire therethrough. In addition, the cutter is extended as the wire carrying member is retracted away from the hooks.

Other objects and advantages of the present invention will be apparent from the following description, reference being had to the accompanying drawings wherein a preferred form of embodiment of the invention is clearly shown.

Figure 1:
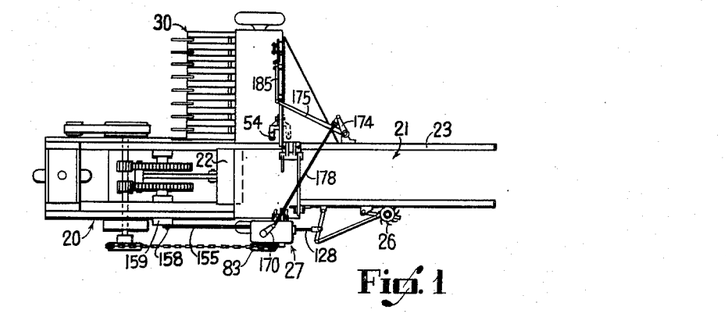
Fig. 1 is a top elevational view of the baling machine showing the wire tying mechanism of the present invention mounted thereon.
Figure 3:
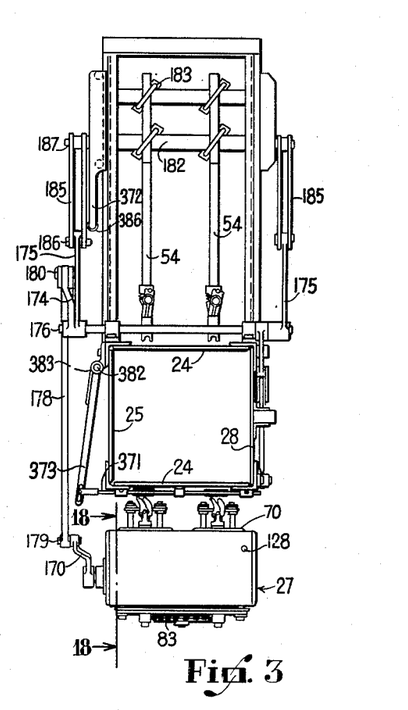
Fig. 3 is a sectional view of the wire tying mechanism of the preceding figures with the sectional being taken along the line 3—3 of Fig. 2.

Referring now to the drawing, a baling press is indicated in its entirety at 20 in Fig. 1 and comprises a long rectangular bale case 21, within which is slidably disposed a reciprocating head or plunger 22. The bale case 21 comprises four longitudinally extending angle members 23 which form the four corners of the bale case and which support the side walls 24, the top wall 25 and the bottom plate 26 as is best seen in Fig. 3. Inasmuch as the baler, with its pick-up mechanism, is not a part of the present invention, all description thereof is omitted for the sake of simplicity. The wire tying mechanism which constitutes the present invention, can be used with any conventional baling apparatus.

In brief reference to the baling press, plunger 22 slides through the bale case from left to right, as seen in Fig. 1, to compress the material being baled into the bale case. When the bale acquires a predetermined length, as measured by the bale length gauge wheel 26, suitable mechanism initiates the operation of the wire tying mechanism indicated generally at 27, which serves to bind the bale with wire.

Figure 2:
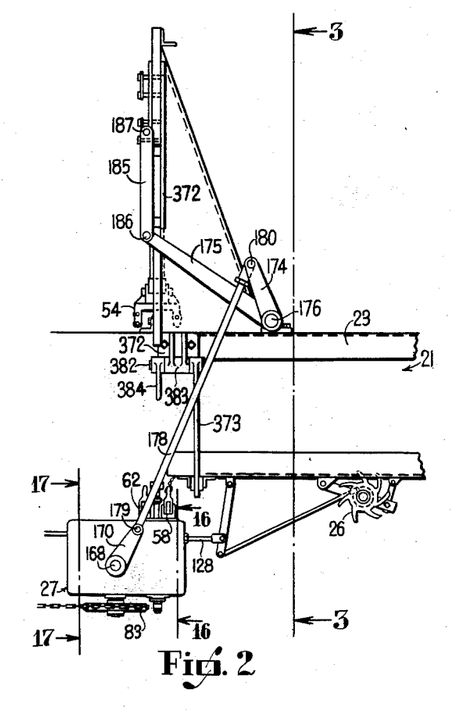
Fig. 2 is a top elevational view of the wire tying mechanism of Fig. 1.

The forming of a new bale will push a completed bale towards the right, as viewed in Figs. 1 and 2, which accomplishes discharging of the completed bales from the discharge end.

In order to fully explain the construction and function of this bale tying mechanism, it is best to first understand the novel type of wire joint or tie formed thereby, and the sequence of movement of the components of the structure which directly contact the wire in forming the tie. As the baler 20 produces a continuous mass of pressed hay, it is therefore a function of the tying mechanism 27 to separate and tie this mass into convenient uniform-sized bales. The tying mechanism herein disclosed performs this function in the sequence shown in sketches 4 through 10 where the cycle of movement of the wire contacting elements of the structure is generally set forth without particular reference to details of the actuating mechanism. My novel actuating mechanism will be treated in detail at a later point in the present disclosure.

It should be noted at the outset that the finished tie, which results from the sequence of operation of the tying mechanism, consists of two loops of wire twisted together. Prior to the twisting together of the two loops, one of such loops was singularly formed by twisting. The other of the two loops is formed simultaneously with the twisting that twists the two loops together.

Figure 4:
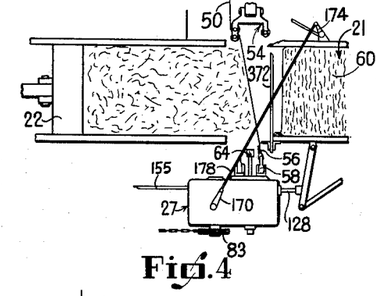
Fig. 4 is a partial top elevational view of the wire tying mechanism of the present invention showing the disposition of the mechanism at the commencement of the bale tying cycle.

Having set forth the characteristics of the finished tie, consideration will be given to the successive steps and operations performed in forming the tie. In starting the tie and with reference to Fig. 4, a wire 50, originating at a source such as a spool, not shown is passed through wire straightening means also not shown. The wire is next threaded through a wire carrier member indicated generally at 54. At this time, wire carrier member 54 will be positioned at the side of the bale chamber 21 as shown in Fig. 4. The end of the wire 50 having the loop 56 formed thereon, is extended across the bale chamber and inserted into a right twister hook 58. Such twister hook will be discussed in detail later herein but at the present time it is sufficient to note that the hook is openable but presently it is closed and provided with suitable latch means for inserting the wire loop 56 into the hooks. The baler is next operated thereby causing material to be baled, such as hay, to be carried by the pick-up mechanism into the path of the plunger 22. Reciprocation of the plunger 22 serves to compact the material being baled into the bale chamber 21. As the wire 50 is dispensably held by a source, the material being compacted will engage the wire 50, pushing the wire into the bale chamber 21 so that such wire partially surrounds the material being baled as it is compacted. The partial surrounding of the compacted material by the wire 50 is first shown in Fig. 5.

Figure 5:
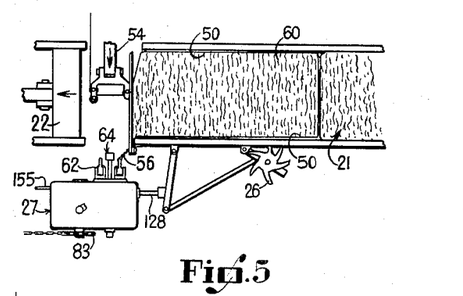
Fig. 5 is a view corresponding to Fig. 4 and showing the wire tying mechanism at a second succeeding stage of the cycle of operation.
Figure 6:
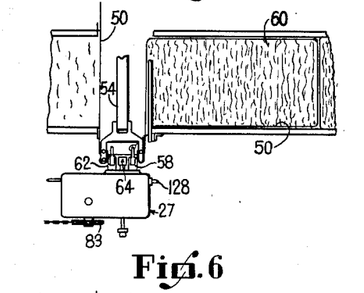
Fig. 6 is a view corresponding to Fig. 4 and showing the wire tying mechanism at a second succeeding stage of the cycle of operation.

The desired length for the bale 60 is determined by the setting of the gauge wheel 26 which revolves in contact with the bale material that is being compressed. At a predetermined point of rotation of the gauging wheel 26, the tying mechanism will start its cycle. By mechanism later to be described, the wire carrier 54 is caused to move across the bale chamber 21, carrying with it the wire 50 as seen in Fig. 5. Referring next to Fig. 6, it will be seen that the wire carrier 54 proceeds across the bale chamber and places the wire 50 through the right spinner hook 58 and a similar left spinner hook 62. Both of the hooks are provided with suitable latch mechanism, later to be described, to allow the entry of the wire 50 therethrough.

With reference to Figs. 4 through 8 it will be seen that wire cutting means indicated generally at 64, is positioned between the wire twisting hooks 58 and 62. Such wire cutting means 64 is retractable and extendible relative to the twister hooks and it is caused, by suitable mechanism later to be described, to move to the retracted position shown in Fig. 6 as the wire carrier member approaches the wire twisting hook. Such retraction is provided to clear the space between the hooks so that the wire carrier means 54 can insert the wire in the hooks.

Figure 7:
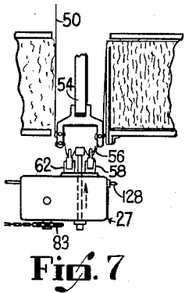
Fig. 7 is a view corresponding to Fig. 4 and showing the wire tying mechanism at a third succeeding stage of the cycle of operation.

The next step in the tying sequence is effected by extending the wire cutting means 64 to the position shown in Fig. 7 which corresponds to the original position occupied by the cutting means 64 in Figs. 4 and 5. With the cutting means extended, the portion of the wire 50 extending between the hooks is engaged thereby and formed into two V-shaped portions with the apex of each V being engaged by one of the wire twisting hooks.

Figure 8:
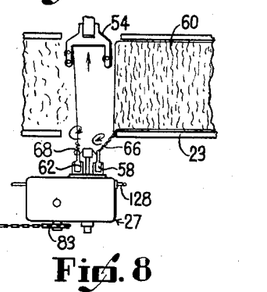
Fig. 8 is a view corresponding to Fig. 4 and showing the wire tying mechanism at a fourth succeeding stage of the cycle of operation.

As the wire cutting means is extended, the wire carrier member is simultaneously moved towards its original position at the other side of the baling chamber. At this point in the cycle the tying action is performed by revolving the two wire twisting hooks about their respective axes as indicated by the arrows in Fig. 8. When such revolution occurs, a double loop 66 will be formed on the right twisting hook with such loop consisting of the original loop 56 and a second loop formed from the portion of wire 50 engaging twisting hook 55. At the same time, a single loop 68 is formed on the left wire twisting hook 62, with such loop being formed in a portion of wire 50 engaged by the twister hook 62. Fig. 8 shows the wire twisting hooks and the loops carried thereon after the hooks have been rotated about their respective axes.

Figure 9:
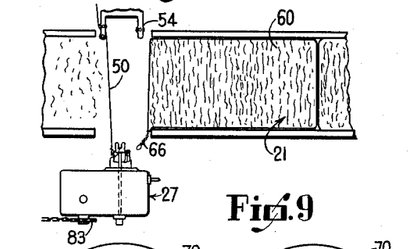
Fig. 9 is a view corresponding to Fig. 4 and showing the wire tying mechanism at a fifth succeeding stage of the cycle of operation.

It should be noted that the wire twisting hooks 58 and 62 are both mounted on a rotatable head 70. Such head is rotatable relative to a casing 72 which houses suitable mechanism later to be described. The next step in the sequence of operation of the mechanism is shown in Fig. 9 and consists in rotating the head 70 through 180° so that the right and left hooks, previously described, will exchange position. Rotation of the head through 180° serves several purposes. At the outset of rotation the portion of the wire extending between the two wire twisting hooks will be severed since the head and the twister hooks carried thereon are rotated relative to a stationary cutter which is in engagement with the portion of the wire between the hooks. Hence rotation of the head 70 serves to cut the wire between the twister hooks.

Upon further rotation of the head 70, and after the wire 50 has been severed, the right spinner hook is caused to open to release the double loop wire tie 66 as best seen in Fig. 9. The right spinner hook 58 then closes upon further rotation of the head and proceeds around through 180° to the position originally occupied by the left spinner hook 62. At the same time the left spinner hook 62 is rotated through 180° to occupy the original position of the spinner hook 58. It should be noted that only the right spinner hook 58 was opened and therefore the left spinner hook 62 will still be carrying the single wire loop 68. With the completion of the rotation of the head 70 the tying cycle is terminated and the configuration of the spinner hook, cutter, wire carrier, and wire 50 will now be identical to the configuration shown in Fig. 4 which shows the disposition of the various components at the outset of a cycle. The only difference between the configuration of the mechanism at the outset of the cycle and at the completion of the cycle results from the fact that the right wire twisting hook 58 and the left wire twisting hook 62 have interchanged positions. The hook nearest the bale again holds the initial single loop corresponding to loop 56 in Fig. 4. This loop, however, has been automatically tied by the mechanism so that the next bale can be bound automatically in a steady flow process. It will be noticed that only the original single loop 56 on the wire end, as seen in Fig. 4, need be tied manually to the hook with such being done at the outset before the tying of the first bale in the steady flow sequence. All succeeding bales are bound and tied in a fully automatic steady flow process.

Figure 10:
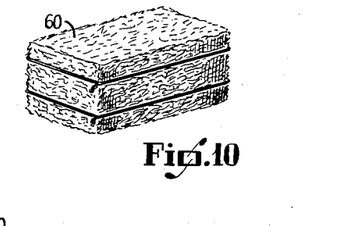
Fig. 10 is a perspective view of a bale formed by a baling machine and having binding wires formed therearound in accordance with the present invention.

The mechanism just described serves to bind only a single wire around the bale and to tie such wire. For convenience of description only the mechanism needed to bind and tie one wire has been described. In practice, two wire twisting heads and two of each of the corresponding elements associated therewith are mounted on the baler as best seen in Fig. 3. Hence, in practice, two binding wires are tied around a bale simultaneously to produce a tied bale as shown in Fig. 10. It will be seen, in Fig. 10, that the double looped wire ties are formed at the corner of the bale where they produce the least obstruction to handling. Also, since each consist of two loops twisted together, there will be no sharp wire ends present to possibly injure a person handling a bale.

Figures 11, 12, 13, 14:
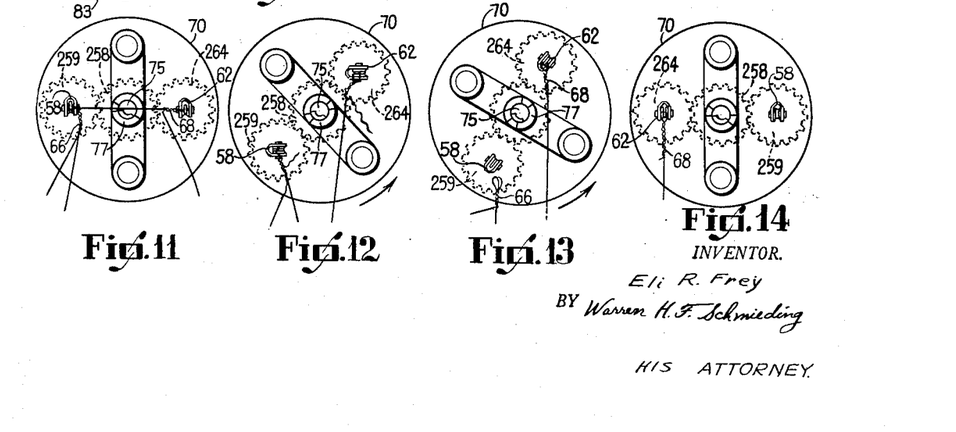
Fig. 11 is a front elevational view of the rotatable head of the present invention showing wire twisting hooks and wire cutting means carried thereon.
Fig. 12 is a view corresponding to Fig. 11 showing the head at a stage of partial rotation.
Fig. 13 is a view corresponding to Fig. 12 showing the head at a succeeding stage of its rotation.
Fig. 14 is a view corresponding to Fig. 13 showing the head after it has been rotated through 180° relative to Fig. 11.

Figs. 11 through 14 are provided to more clearly show the rotation of the head 70 and the wire cutting operation. Referring particularly to Fig. 11 a face view of the rotatable head 70 is shown at the stage in the operation shown in Fig. 8. Both of the wire twisting hooks have been rotated about their respective axes so that the twisting hook 58 contains a double loop tie 66 which fastens together the ends of the wire which has been passed around the bale. The wire twisting hook 62 contains a single loop of wire 68. It will be noted that a portion of the main wire strand 50 extends between the two wire twisting hooks and is in engagement with the wire cutting means indicated generally at 64. Such wire cutting means comprises a central cutter 75 which is held stationary relative to rotation of the head 70 and a cutter housing portion 77 which is rotatable with the head 70.

Referring next to Fig. 12, it will be seen that at the outset of rotation of the head 70 the cutter housing 77 engages the wire and rotates it therewith to sever it against the centrally disposed cutter 75.

Upon still further rotation of the head 70, as seen in Fig. 13, the hook 58 is opened to release the double loop wire tie 66 therefrom. It will be noted that the other hook 62 remains closed and contains the single wire loop 68.

Upon further rotation of the head 70 the hook 58 closes, having dropped the double looped wire tie 66, and proceeds through the remainder of the 180° rotation to index in the position originally occupied by the hook 62.

The clutch mechanism

Figure 15:
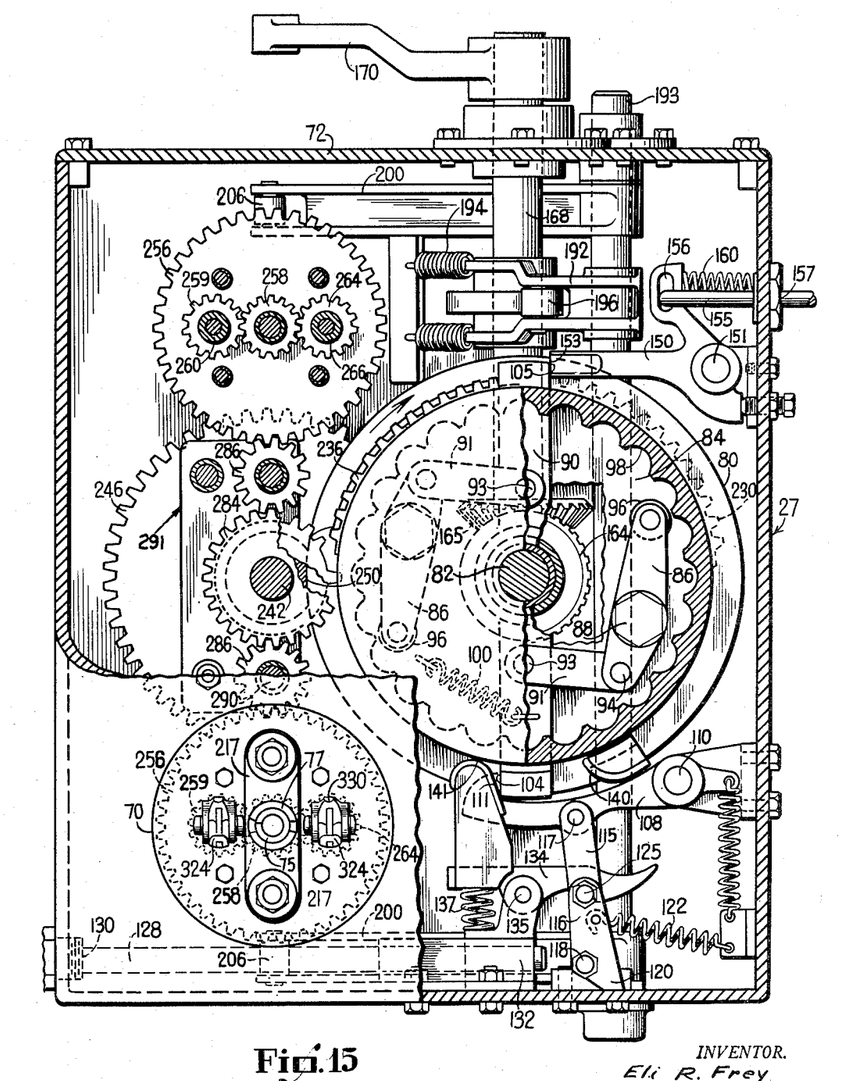
Fig. 15 is a front view of the encased mechanism of the present invention with the view being taken partially in section along the line 15—15 of Fig. 18.
Figures 18, 19, 20, 21:
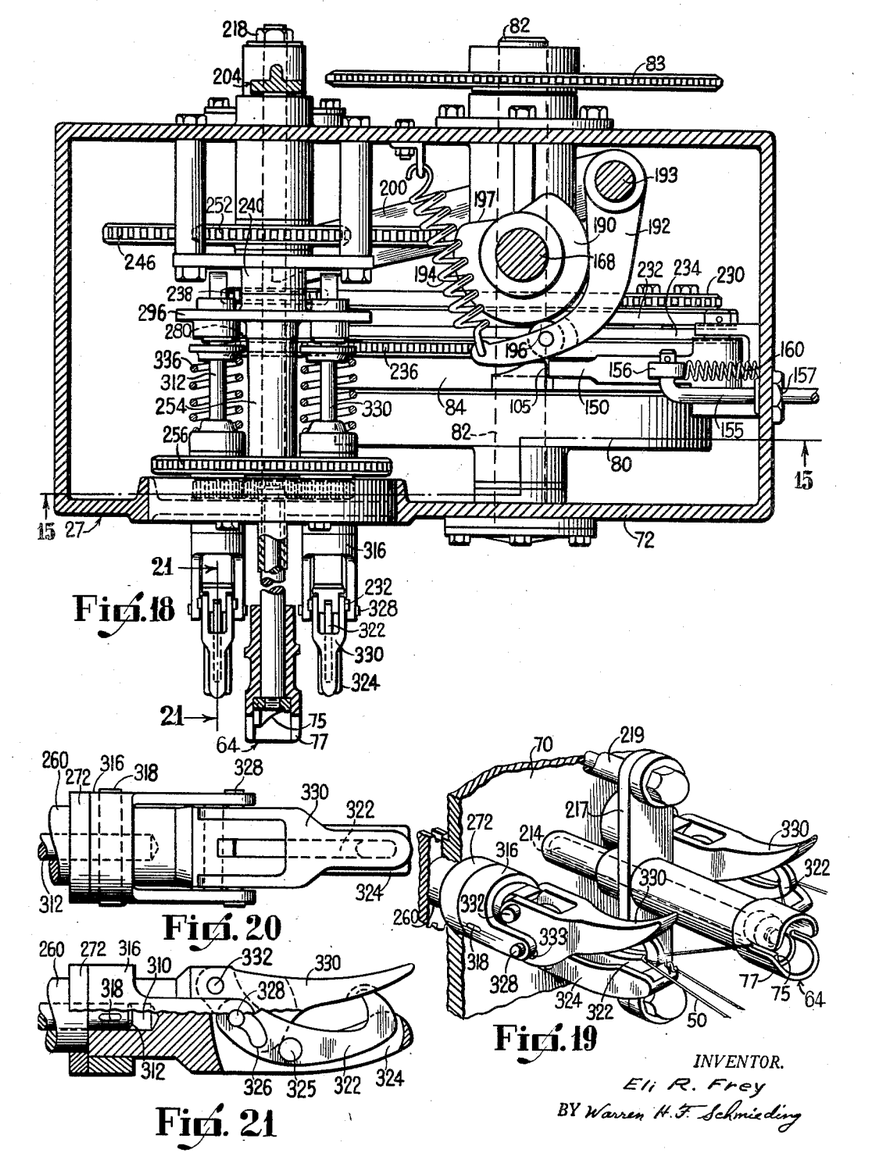
Fig. 18 is a top elevational view of the mechanism of Figs. 14 through 16 with the view being taken partially in section along the line 18—18 of Fig. 3.
Fig. 19 is a perspective view of the wire twisting hook and wire cutting means of the present invention.
Fig. 20 is a top elevational view of the wire twisting hook in Fig. 19.
Fig. 21 is a side elevational view corresponding to Fig. 20 with the view being taken partially in section along the line 21—21 of Fig. 18.

Referring to Fig. 15 the interior of the mechanism housing 72 and the mechanism encased therein is shown as viewed from the front of the casing. In Fig. 18 a top view of the same mechanism is shown. The clutch mechanism comprises a drum type housing 80 which is fixedly mounted on a rotatable shaft 82. As is seen in Fig. 18, a sprocket 83 is mounted on a portion of the shaft 82 which extends outside the mechanism casing 72. Sprocket 83 is connected with a prime mover not shown to rotate the sprocket 83 on the shaft 82 and the clutch drum 80 at a constant rate. A driven clutch portion is provided on the shaft 82 in the form of the plate 84 best seen in Fig. 15. Plate 84 and other associated members later to be described are normally free of rotation with shaft 82.

Referring to Fig. 15, means for engaging the rotating clutch drum 80 with the driven clutch plate 84 are present in the form of the dogs 86 which are pivotally mounted on the plate 84 by the stud 88. The two dogs 86 are each connected to a clutch release bar 90 by the link 91. Link 91 is pivoted to the clutch release bar 90 at pivot 93 and to the dog 86 at pivot 94. Each of the dogs 86 is provided with a roller 96 with each roller being engageable with any of a plurality of peripherally disposed recesses 98 which are formed in the interior of the clutch drum 80. A spring 100 extends between the clutch plate 84 and the clutch release bar 90. The clutch release bar is freely rotatable about the drive shaft 82, as is the driven clutch plate 84. The clutch release bar 90 is also freely rotatable independent of the clutch plate 84 so that movement of a bar 90 relative to the plate 84 in a clockwise direction, as seen in Fig. 15, will cause the rollers 96 to engage with the depressions 98 in the clutch drum 80. The plate 84, and its associated mechanism later to be described, will then be rotated with the clutch drum 80. The spring 100, being disposed between the plate 84 and the bar 90, constantly urges engagement of the dogs with the clutch drum. On the lower end of the bar 90, however, a latch surface 104 is provided as seen in Fig. 15. On the upper end of the clutch bar 90, a second latching surface 105 is provided. These two latching surfaces are operatively associated with suitable clutch releasing mechanism next to be described.

The clutch release mechanism

As is best seen in Fig. 15 a lever 108 is pivotally mounted to the case 72 at the pivot 110. A latching surface 111 is formed on one end of the lever 108 and engageable with the latching surface 104 on the lower end of the clutch release bar 90 previously described. It is therefore seen that the lever 108 is adapted to hold the clutch bar 90 in the position shown in Fig. 15 in opposition to the tension of the spring 100 thereby serving to hold the dogs 86 out of engagement with recesses 98 so that the clutch is in the idle position when disposed as shown in Fig. 15. A toggle joint, comprising the links 115 and 116 is pivotally connected to the lever 108 at the pivot 117 and to the case 72 at the pivot 118. A stop portion 120 is formed on the link 116 and engageable with the case 72, to stop the toggle connection at a past center position as seen in Fig. 15. A spring 122 is connected between the toggle link 116 and the case 72 to constantly urge the toggle connection to its past center position. The toggle links 115 and 116 are themselves pivotally connected by the pin 125 which has a portion extending through the two links to serve as a latch. It will therefore be seen that latch pivot 125 is moved from the position shown in Fig. 14 through dead center to the left, the effective length of the toggle connection will be lessened and the lever 108 will be disengaged from the clutch bar 90. Engagement of the dogs 86 with the recesses 98 will then occur and the driving and driven clutch members will thereby be engaged.

The clutch bar is released and the clutch is engaged only once for each bale being tied and only after the bale has been compacted to a predetermined length. Suitable mechanism, responsive to the length of the material being baled, is provided to engage the toggle links 115 and 116 and move it to the left, past dead center, from the position shown in Fig. 15. The mechanism for moving the toggle links comprises a rod 128 which is mounted movably responsive to the bale length gauge wheel with the rod 128 extending through the case 72 at the hole 130. On the interior end of the rod 128 the lever mount 132 is mounted so as to be slidable on the case 72 responsive to movement of the rod 128 in the hole 130. A resetting lever 134 is pivotally mounted at 135 to the lever mount 132. Such resetting lever 134 is latchingly engageable with the pivot latch 125 between the toggle links 115 and 116 and a spring 137 is compressed between the resetting lever and the lever mount to constantly urge latching engagement between the resetting lever 134 and the pivot 125 between the toggle links. It will now be seen that when the rod 128 is moved to the left, as seen in Fig. 15, upon progressive increase of the bale length, the lever mount 132 and the resetting lever 134 will move to the left carrying with them the pivot latch 125, thereby shortening the effective length of the toggle links 115 and 116 until the clutch bar 90 is released from latching engagement with the lever 108.

Since the complete tying operation is completed in one rotation of the clutch assembly, it is desirable to reset the lever 108 to a position engageable with the clutch bar 90 as soon after it has released the clutch bar as possible. To accomplish this a cam surface 140 is mounted on and rotatable with the driven clutch plate 84. Upon release of the clutch bar and engagement of the clutch, the cam 140 will rotate in a clockwise direction, as seen in Fig. 15, and into engagement with a second cam surface 141. The cam 141 is fixedly mounted on the resetting lever 134 and to the left of the pivot 135 so that engagement of the cam 140 with the cam 141 will pivot the resetting lever 134 in a counterclockwise direction about its pivot 135 thereby causing resetting lever 134 to release the latch pivot 125 and the toggle links pivotally joined thereby. Upon such release the spring 122 will urge the toggle connection to its original locked position to the right of dead center, as shown in Fig. 15. The left end of the lever 108 will thereby be moved upwardly to a position suitable for reengaging the clutch bar 90 as the clutch bar rotates in a clockwise direction around to its original position shown.

*Supplemental clutch release mechanism responsive to the position of the plunger in the bale case*

It will be noted that the clutch release mechanism just described is responsive to a predetermined bale length and such mechanism serves to release the clutch bar 90 only one time for each bale and only at the completion of the compacting of sufficient material in the bale chamber to form such bale.

Since the wire carrier arms, 54 as best seen in Figs. 1 through 3, are movable across the path of the baling press plunger 22 it is not only necessary to release the clutch mechanism at predetermined bale length, but it is also necessary to release such mechanism at the specific point in the plunger reciprocating cycle at which point the plunger has been retracted away from the material being baled and out of the path of movement of the wire carrier arms. Such additional release mechanism is provided in the form of a lever 150 pivotally mounted to the case 72 at 151 as best seen in Fig. 15. Lever 150 is formed with a latching surface 153 which is engageable with the latching surface 105 on the clutch bar 90. It will be noted that the lever 150 opposes clockwise rotation of the clutch bar 90 in a manner similar to that of the lever 108 of the previously described release mechanism. A rod 155 engages the lever 150 at the slot 156 with such rod extending outside the case through the hole 157. The rod 155 extends to a crank pin 158 which is eccentrically mounted on a crankshaft 159. The crankshaft 159 serves to reciprocate the plunger 22 and the rod 155 in timed relationship. Hence the rod 155 is made movably responsive to the movement of the compacting plunger. The extension of rod 155 to the plunger 22 is best shown in Figs. 1 and 2. Hence when the plunger is retracted away from the material being baled and away from the path of the wire carrier arms 54, the rod 158 will move to the right, relative to the position shown in Fig. 15. Lever 150 is thereby pivoted about its pivot 151 in opposition to the compression force of a spring 160. Upon the pivoting of the lever 150, the left end carrying the latch surface 150 will rotate in a clockwise direction to release the clutch bar 90 so that such clutch bar can rotate to actuate the dog 86. Such rotation of clutch bar 90 occurs only if the lower clutch release mechanism, previously described, is also in the release position.

Hence it will be seen that engagement of the clutch occurs only once in the formation of a bale and therefore only once in a tying cycle, and that such release is responsive to two independent clutch release mechanisms. One of such release mechanisms is responsive to a predetermined bale length and the second of such clutch release mechanisms is responsive to the position of the compacting plunger of the baling machine. Therefore, the clutch is released for actuation only when the bale has reached its desired length and only when the plunger is clear of the path of the wire carrying arms 54 so that the tying mechanism can operate without interference from the baling plunger.

*The first half revolution of the clutch assembly*

The complete tying operation is performed by the present apparatus with one revolution of the clutch assembly. Such rotation commences upon engagement of the rotatable drum 80 by the dogs 86. For clarity of disclosure the first half revolution of the clutch assembly will be described in detail. The second half revolution will be subsequently and separately described.

In general, the first half revolution accomplishes two things. A wire carrier member 54 is moved from the position shown in Fig. 4 across the baling chamber to place the wire 50 in the wire twisting hooks as is seen in Fig. 6 and secondly the cutter mechanism 64 is retracted from the position of Fig. 4 to the position of Fig. 6 to clear the space between the hooks for reception of the wire 50. The specific mechanism for accomplishing these two things and the association of such mechanism with the clutch assembly will next be described.

Figure 17:
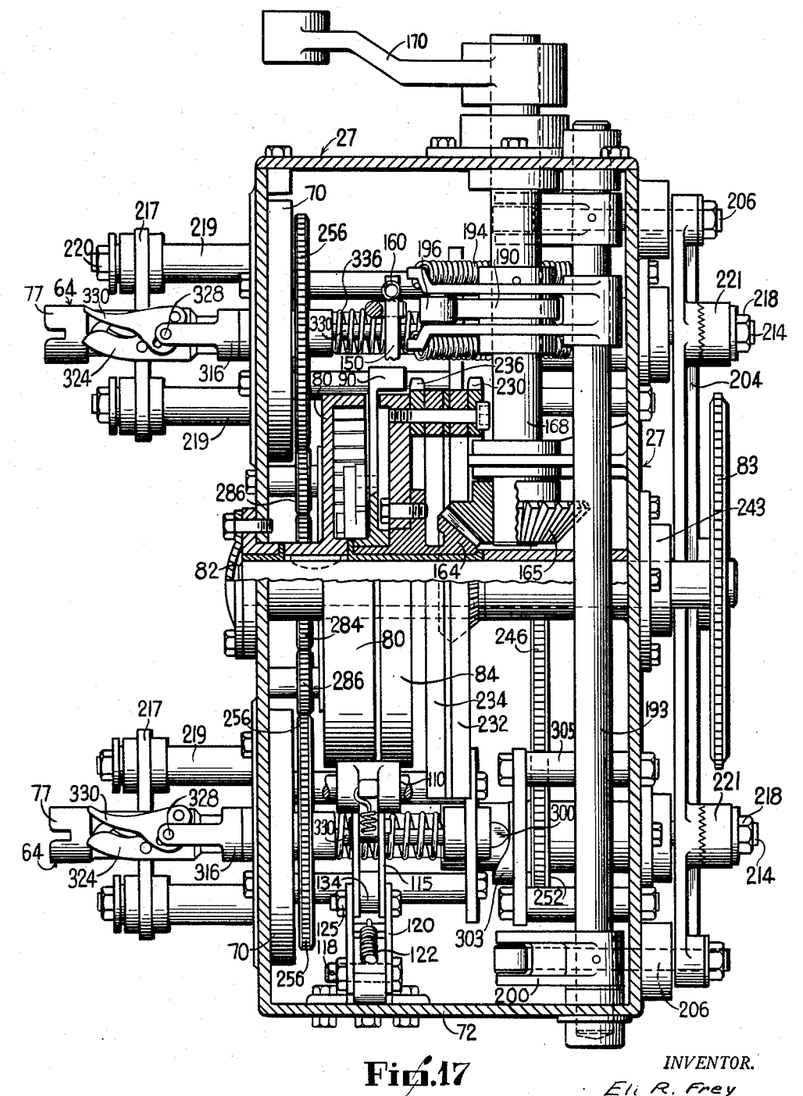
Fig. 17 is a right side elevational view of the encased mechanism shown in Figs. 15 and 16 with the view being taken in section along the line 17—17 of Fig. 2.

Referring to Figs. 15 and 17 it will be seen that a beveled gear 164 is mounted rotatable with the driven clutch plate 84 so that gear 164 is rotated upon engagement of the clutch drum 80 with the plate 84 by means of the dogs 86. Rotation of beveled gear 164 serves to rotate a driven beveled gear 165 mounted on a shaft 168 which shaft is rotatably carried in the housing 72. It will be noted that shaft 168 extends outside the housing 72. On the exterior end of the shaft 168, an arm 170 is fixedly mounted. Reference is now made to Figs. 1 and 2 where the arm 170 is again shown in its mounted position on the shaft 168. Upon release of the clutch assembly, the shaft 168 and the arm 170 will rotate in a counterclockwise direction as seen in Fig. 2. As a result, a chain of linkage will be actuated to move the wire carrier 54 across the bale chamber. Such chain of linkage comprises the levers 174 and 175 which are pivotally mounted to the baler frame at 176. A rod is connected to the arm 170 at the pivot 179. Rod 178 extends to a lever 174 where it is connected at a pivot 180. Two wire carrier members 54 are secured to two transverse member 182 by the U-bolts 183 as shown in Fig. 3. The two wire carrier members 54 and the cross members 182 are slidably mounted as a unit, on the baler 20. A bar 185 is pivotally connected at one end, at 186, to lever 175 and pivotally connected at the other end, at 187, to the assembly composed of the wire carrying members 54 and the cross members 182 as best seen in Figs. 2 and 3. Hence it is seen that upon rotation of the shaft 168, and by means of the linkage just described, the wire carrier members 54 will be extended across the bale chamber to a position of engagement with the wire twisting hooks 58 and 62.

Figure 16:
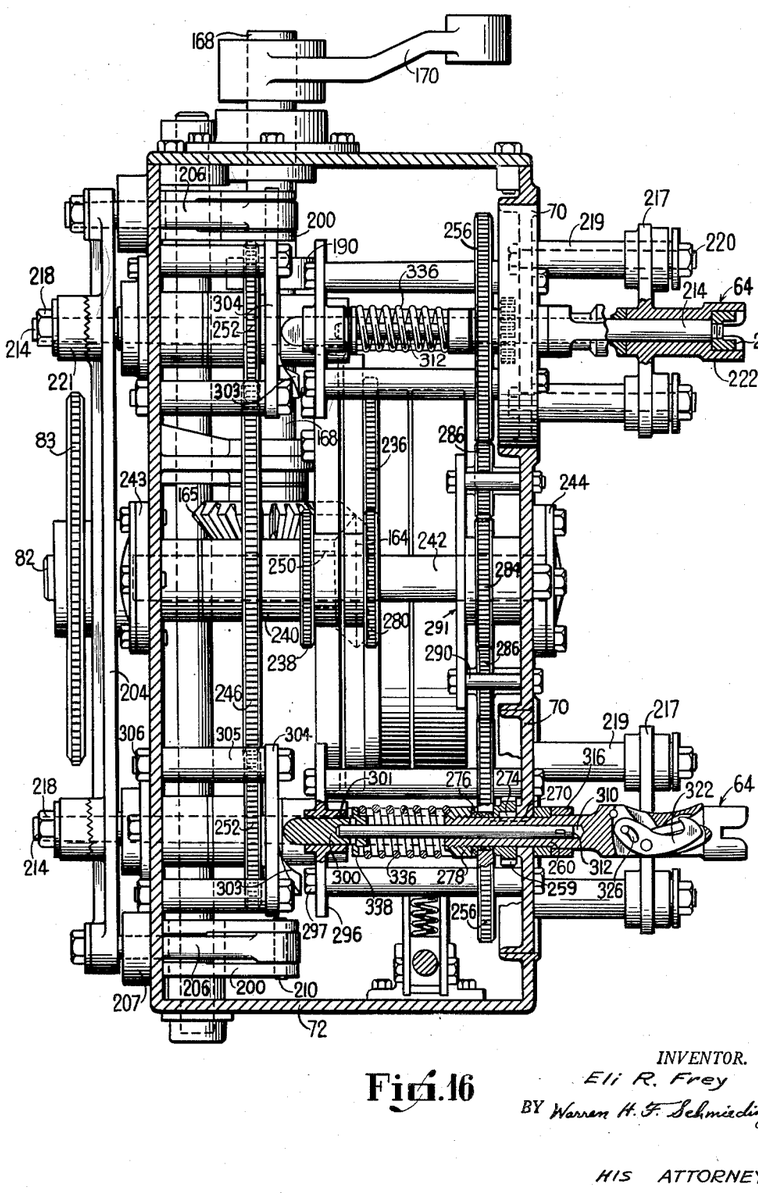
Fig. 16 is a left side elevational view of a mechanism of Fig. 15 showing such mechanism partially in section along the line 16—16 of Fig. 2.

As the wire carriers approach the wire twisting hooks, it is necessary to retract the cutter mechanism 64 to the position shown in Fig. 6. The mechanism for accomplishing this is best understood by first referring to Fig. 18 where a cam 190 is shown mounted on the shaft 168 previously described. It will be remembered that shaft 168 is rotatable by the clutch assembly and serves to bring the wire carrier members 54 toward the spinner hooks. As the wire carrier members approach the spinner hooks, cam 190 comes into position to let arm 192 be rotated on its pivot 193 by action of the springs 194. Such rotation occurs when the follower 196 engages the flat 197 on the cam 168. An arm 200 is also mounted on the shaft 193 actuated and upon movement of the arm 192. The function of arm 200, of retracting the cutter mechanism, can best be understood by referring to Fig. 16 and to the diagrammatic view Fig. 22. In Fig. 16 the arm 200 is again seen to be mounted on shaft 193. A bracket 204 is shown slidably mounted to the case 72 by means of the guide pins 206 which are slidably mounted in the bosses 207, hence it will be seen that upon rotation of the shaft 193 the arm 200 will be actuated. The arm 200 is pivotally mounted to the slidable guide pins 206 at one end thereof. Movement of the arm 200 will therefore slide the guide pins 206 and the brackets 204 to the left relative to the case 72 as seen in Fig. 16. Upon movement of the bracket 204 to the left, shafts 214, which are secured to the bracket at their left end as seen in Fig. 16, are moved with the bracket. As a wire cutter assembly 64 is mounted on the right end of each shaft 214, the cutter assembly 64 will be retracted relative to the wire twisting hooks when the bracket 204 and the shafts 214 are moved by action of the arm 200.

To provide retracting means for the wire cutting means 64 a bracket 217 is slidably mounted on the tubes 219 which are in turn secured to the rotatable head 70 by a bolt and nut assemblies 220. It will be noticed, with particular reference to Fig. 19, that the bracket 217 is secured to the cutter housing 222 so that such housing will be rotated upon rotation of the head 70, in a manner later to be described in detail. At this time, however, it should be noted that the cutter housing 222 is rotatable relative to the shaft 214 with said shaft carrying a central cutting member 224, hence it will be seen that the shaft 214 extends from the bracket 204 to the cutter means for retracting and extending it. It should also be noted that the brackets 217 serve to secure the cutter housing 222 to the rotatable head so that such carrier housing can be rotated, relative to the central cutting member 224 for cutting the wire 50. Rotary adjustment of the central cutting member 224 relative to the cutter housing 222 is accomplished by loosening the nut 218 and rotating the shaft 214 and a serrated collar 221 which is keyed to the shaft. The shaft 214 and collar 221 are rotated relative to the bracket 204. The nut 218 is then tightened to lock the shaft 214 and the central cutting member 224 in a new position.

The wire carrier 54 starts receding away from the wire twisting hooks upon further rotation of the shaft 168. At this time the wire cutting means 64 is extended to its original position shown in Fig. 7. Hence the wire cutting means 64 engages the portion of wire 50 which extends between the wire twisting hooks. The wire cutting means is then in position to cut the wire. By referring to Fig. 18 it will be understood that the extension of the wire cutting means 64 to its extended position occurs when the follower 196, on the arm 192, moves off the flat 197 on the cam 190. That is to say, retracting of the wire cutting means 64 occurs only when the follower is in engagement with the flat on the cam.

*The second half revolution of the clutch mechanism*

In general it should be noted that as the wire carrying members 54 are retracted across the bale chamber from the position shown in Fig. 7 to the position shown in Fig. 8, the tying action is being performed by the rotation of the wire twisting hooks about their respective axes. At this time the double loop wire tie 66 is formed on the right wire twisting hook 58 and at the same time the single wire loop 68 is being twisted on the wire twisting hook 62.

The mechanism for twisting the wire twisting hook is actuated by the clutch mechanism and may best be understood by starting at such mechanism and tracing the chain of linkage through to the wire twisting hooks 58 and 62. The mechanism is best shown in Figs. 15, 17 and 18 and the diagrammatic view of Fig. 22. Referring to the top view of the mechanism, Fig. 18, attention is again called to the previously discussed portions of the clutch assembly which include the rotatable drum 80 keyed to the shaft 82 and driven at a steady rate thereby. The clutch assembly also includes the driven plate 84 which is engageable with and rotated by the drum 80 upon actuation of the release mechanism previously described.

Figure 22:
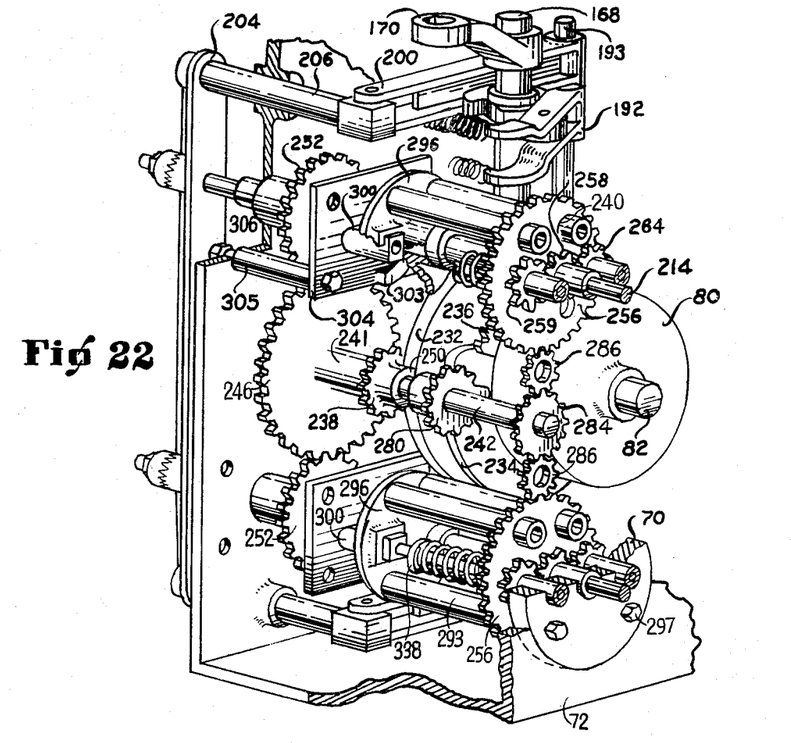
Fig. 22 is a diagrammatic view of the encased mechanism shown in Figs. 15 through 18.

As is best seen in Figs. 18 and 22, a gear segment 230, a slide 232, a second slide 234 and a second gear segment 236 are co-axially disposed with, and fastened to, the driven clutch plate 84 so that rotation of the clutch plate 84 by the clutch drum 80 also serves to rotate the gear segments and the slides about the axis of the shaft 82. At the same time, the gear segments and slides are independently free of rotation of the shaft 82 when the clutch drum 80 and the clutch plate 84 are in disengaged relationship.

The slide 232 is positioned to lockingly engage a driven gear 238 which has a hub 240 mounted freely on the shaft 242. The shaft 242 is mounted for free rotation in the bearing assemblies 243 and 244. A gear 246 is also mounted on the hub 240, with the gear 238, and adopted for rotation therewith. To keep the two gears 238 and 246 in a locked position prior to the time the gear segment 230 engages the gear 238, the hub 240 is provided with a concave portion 250 which is engaged by the slide 232. The engagement of the slide 232 with the concave portion 250 is best seen in Fig. 22. However, as the wire carriers 54 are receding and are clear of the wire twisting hooks and wire cutting means 64 is back in its extended position, as is seen in Fig. 7, the gear segment 230 will engage the gear 238 at which time the slide 232 will move off its seat in the concave portions 250. Then gear 238 and gear 246 will turn one revolution along with their common hub. This will cause a driven gear 252 to be rotated two revolutions by the single revolution of the gear 246 since the ratio of the respective diameters is two to one. Gears 246 and 252 are best seen in the diagrammatic view Fig. 22.

Figure 23:
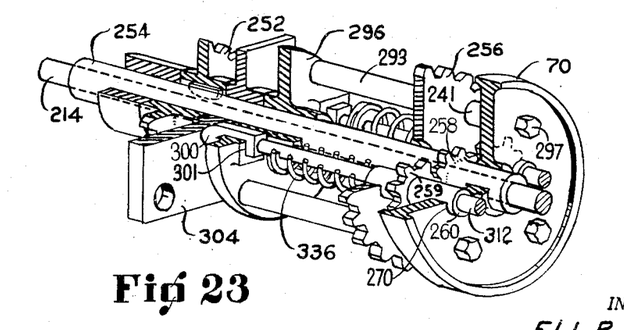
Fig. 23 is an enlarged perspective view of a portion of the mechanism of Fig. 22.

Referring next to Fig. 23, gear 252 is mounted on a housing 254 which is rotatable on the shaft 214. The housing 254 extends freely through the gears 256. Such housing has a gear 258 mounted at the forward end thereof. Hence it will be seen that the gear 252, the housing 254 and the gear 258 rotate as a unit on the shaft 214. The gear 258 is in driving engagement with the gear 259 mounted on a shank portion 260 for one of the wire twisting hooks 62. The gear 258 is also in driving engagement with a gear 264 mounted on a shank portion 266 for the right spinner hook. Hence the gear 252 rotates through two revolutions upon rotation of the clutch assembly and and the gear 258, which is co-axially mounted therewith, will also rotate two revolutions. Hence the gear 259 and the spinner hook 62 will be rotated through two revolutions due to the one to one ratio of the gears 258 and 259. In a similar manner, the wire twisting hook 58 will be concurrently rotated through two revolutions.

Referring to Figs. 16 and 23, the rotatable mounting of the spinner hook 62 in the head 70 may best be seen. A main shank portion 260 passes through a hole 270 in the head 70. A gear 259 is keyed to the shank portion 260 by the key 274. The shank portion 260 then passes freely through the gear 256 at the bushing 276. A threaded fastening 278 is screwed on the inner end of the shank 260. Hence it will be seen that the wire twisting hook shank 263 is rotatably mounted in the head 70.

It will be noted that the mechanism just described serves to rotate the wire twisting hooks two revolutions during the initial stage of the second half of the revolution of the clutch mechanism. After the hooks have been rotated, the right spinner hook nearest the bale, will be holding a double looped wire tie and the left spinner hook will be holding a single loop.

It is now necessary to rotate the head 70, and the two wire twisting hooks carried thereon, for the purpose of cutting the wire 50 extending between the wire twisting hooks, and for the further purpose of dropping the double looped wire tie as the two wire twisting hooks change positions. The mechanism for accomplishing the rotation of the head can best be understood by again considering the driven clutch plate 84 and the slide 234 and the gear segment 236 which are rotated with the clutch plate 84 upon its engagement with the rotating drum 80. As is seen in Fig. 16 and Fig. 18, and in the diagrammatic view of Fig. 22, the gear segment 236 is adapted to drivingly engage a gear 280. The gear 280 is mounted on the shaft 242 for driving such shaft. A gear 284 is also mounted on the shaft 242, with the gear 280, and rotatable therewith. Hence it will be seen that the gears 280 and 284 are both rotatable by the gear segment 236 upon engagement with the clutch mechanism. To continue the chain of mechanism for rotating the head, it will be seen that the gear 256 is driven by the gear 284 through an idler gear 286. The idler gear 286 is rotatably mounted on the shaft 290 which extends between the case 72 and the bracket 291. The gear 256 is mounted on the rotatable head 70 in driving relation therewith, by the tubes 293 which pass through holes 241 in the gear 256, with such tubes abutting, at their forward ends, against the head 70. The rear ends of the tubes 296 are in abutting relationship with a rear head member 296. The machine bolt and nut assemblies 297 fasten together the front head plate 70 the rear head member 296 and the tubular members 293. Hence it is seen that the rotation of the gear 256 by the chain of mechanism just described, will effect rotation of the front head plate 70, the rear head member 296, and the wire twisting hooks mounted thereon.

It is necessary to open the right spinner hook after rotation of the head has started so that the double looped wire tie can be dropped as the spinner hook is rotated away from the bale. The mechanism for accomplishing this is best seen in Figs. 22 and 23. The rear head member 296 is provided with a cam follower 300 slidably mounted in the hole 301 in the rear head member 296. Upon rotation of the head, the follower 300 will engage the cam 303 mounted on the bracket 304. It should be noted that the bracket 304 is mounted stationary relative to the case 72. Hence the cam 303 is also stationarily mounted. The cam 303 and the bracket 304 are mounted to the casing 72 by the spacers 305 and the bolts and nuts 306.

The specific mechanism for opening the wire twisting hooks will now be considered. Reference is made to Figs. 16 and 23 where it is seen that the main shank portion 260 of the wire twisting hook 258 is provided with a hollow portion 310 in which is slidably carried a push rod 312. The push rod 312 is slidably actuated by the follower 300 which is secured to the inner end of the rod 312. Upon engagement of the follower 300 with a cam 303 the push rod 312 is slidably actuated. A slidable collar 316 is carried on the twister hook shank portion 260. The collar 316 is pinned to the rod 312 by the pin 318.

Reference is now made to the detailed views 19, 20 and 21 for consideration of the structure of the wire twisting hooks per se. The main shank portion 260, the push rod 312 slidably carried therein, and the collars 316 are again shown. Pin 318 serves to pin the collar 316 to the shaft 312. Pin 318 is preferably of oval cross section to provide added shear strength.

A hook 322 is pivotally mounted in a slotted housing portion 324 by the pin 325. Hook 322 is provided with a curved slot 326. A pin 328 carried by the collar 316 serves to engage and actuate the hook towards an open position upon forward sliding of the collar 316 on the shank portion 260. A pivotally mounted finger portion 330 is secured to the shank portion 260 by the pin 332. The finger 330 is provided with a curved slot 333 as is best seen in Fig. 19. Hence the finger portion 330 will also be actuated upon the sliding of the collar 316, forwardly, since the pin 328 is in sliding engagement with the curved slot 333 in the finger portion. It will therefore be seen that both the hook 322 and the finger portion 330 are actuated by cam action.

To constantly urge the movable elements 322 and 330 towards closed position, and with reference to Figs. 16, 17, and 22, it will be seen that a spring 336 is provided on the shaft 312 between the threaded fastening 276 and a spring keeper 338 which is secured to the shaft 312. Hence it will be seen that the spring 336 is disposed to constantly urge the movable elements 322 and 330 to the closed position, with the spring 336 being yieldable upon engagement of the follower 300 with the cam 303. The wire twisting hook 258 is thereby opened against compression of spring 336.

It will now be seen, that by means of the hook opening mechanism just described, and as the head 70 is rotated by the second half revolution of the clutch assembly, the wire twisting hook 58 will be opened at the proper time by camming action, to drop the double looped wire tie as is best seen in Figs. 9 and 13.

After the hook has been opened and the tie has been dropped, the rotatable head 70 and the mechanism carried therewith will be carried through the balance of the stroke of rotation to complete 180° index. The wire twisting hook will then have exchanged positions and the left wire twisting hook will have carried its single loop of wire around to a position adjacent to the bale. The clutch assembly will have completed its single revolution necessary to complete the cycle. The clutch releasing mechanism will be in engaging relationship with the clutch and the mechanism will be ready to begin its cycle anew.

At this time the reciprocating plunger of the baler will start forming a new bale by compacting material to be baled into the baling chamber and against new pieces of wire which will become the binding wires for the new bale. The plunger will continue to compact material into the baling chamber until a bale of predetermined length has been compacted as measured by the bale length gauging wheel as previously described.

*The wire shifting mechanism*

Figures 24, 25:
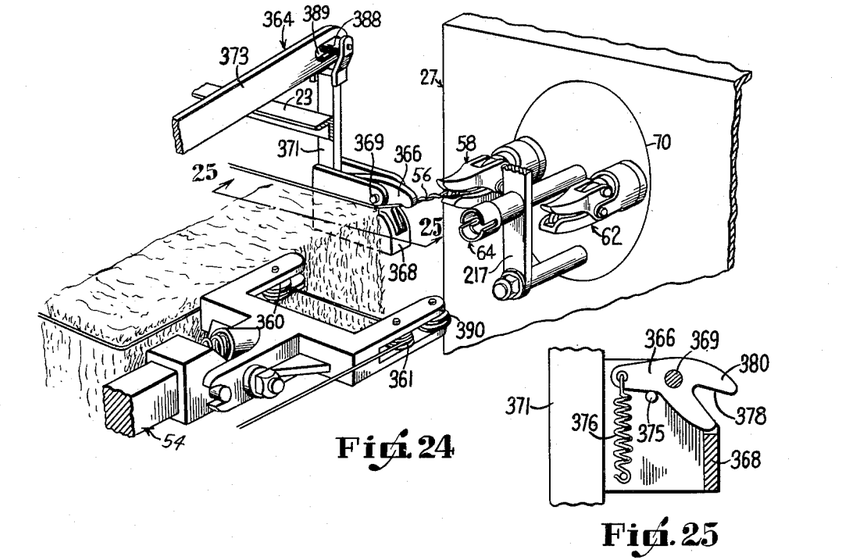
Fig. 24 is a perspective view of the wire tucking mechanism of the present invention.
Fig. 25 is a side elevational view, partially in section, of a portion of the wire tucking mechanism of Fig. 24. The section is taken along the line 25—25 of Fig. 24.

With reference to Fig. 24, it will be noted that the wire twisting hook 58 contains a single loop 56 on the end of wire 50 which extends around the bale. The loop 56 and an adjacent portion of wire 50 will normally lie in the path of the wire carrier 54. It is therefore necessary to shift the wire end with loop 56 away from the path of the wire carrier 54 so that the portion of wire 50, which extends between the rollers 360 and 361, can be inserted into the wire twisting hooks 58 and 62. Means for shifting the wire is indicated generally at 364 in Fig. 24.

The wire shifting means 364 comprises a wire engaging element 366 which is pivotally mounted to a bracket 368 at the pin 369. The bracket 368 is carried by an arm 371 which mounted to the baling chamber frame members 23 so as to be vertically slidable relative to such frame. A lever 373 is provided to shift the arm 371 upwardly and downwardly. Lever 373 is actuated by suitable mechanism later to be described.

Referring to Fig. 25, the bracket 368 is shown in section with the wire engaging element 366 pivoted therein at 369. Element 366 is provided with a stop 375 and a spring 376 as shown. The right end of element 366 is notched at 378 for receiving the wire 50 upon downward movement of arm 371 as seen in Fig. 24. The right end of element 366 is also provided with a cam portion 380 which is engageable, upon upward movement of arm 371, with the portion of wire 50 that is placed in the wire twisting hooks by the wire carrier 54.

Hence it will be seen that as the wire carrier 54 is extended toward the wire twisting hooks 58 and 62, the arm 371 will be moved downwardly causing the element 366 to engage and shift the wire, at loop 56, out of the path of the approaching wire carrier 54. After the wire has been placed in the wire twisting hooks, and the wire carrier 54 is retracting away from the hooks the arm 371 is shifted upwardly causing the cam portion 380 on element 366 to strike the portion of wire 50 which has been inserted in the wire twisting hooks. When the element 366 strikes the wire on the upstroke of arm 371 the element 366 will yield, by pivoting on pin 369, thereby allowing the element 366 to pass by the wire and return to its original position above the hook and wires. The element 366 will then have completed its cycle of operation and it is therefore ready for the next bale.

The linkage for actuating arm 371 will now be described. With reference to Fig. 3, it will be seen that lever 373 is mounted on shaft 382 which is journaled in the bracket 383. Such bracket is secured to the frame member 23. A second lever 384 is mounted at one end to shaft 382. The other end of lever 384 extends to a position adjacent to the path of a carriage 372 which carriage is secured to the transverse members 182. Members 182 also serve to mount the wire carriers 54. When the wire carriers 54 are extended towards the wire twisting hooks, a roller 386, mounted on the carriage 372, will be caused to engage the end of lever 384. The shaft 382 and the lever 373 mounted thereon will be rotated. Since the end of lever 373 engages the arm 371 at the pin 388 and slot 389, the arm 371 will be shifted downwardly when the wire carrier 54 is extended causing the roller 386 to engage and rotate lever 384. When the wire carrier 54 is retracted, the roller 386 will disengage the lever 384, thereby allowing the arm 371 to move upwardly to its original position.

*The yieldable wire carrier*

Figure 26:
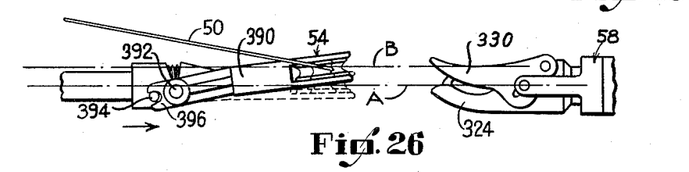
Fig. 26 is a side elevational view of the wire carrier means of the present invention. Such view shows the disposition of such means as it is being extended towards the wire twisting hooks.

Fig. 26 shows the configuration of wire carrier 54 as it is extended toward the wire twisting hooks, one of which is shown at 58. At this position the end portion 390 is shown in a yielded position by the solid line delineation. The broken line delineation of end portion 390 shows the normal position thereof. End portion 390 is pivoted at pin 392, with the pivotal movement being limited by the stop pin 394 which is disposed within the yoke 396.

The end portion is caused to yield from a normal path A to the displaced path B by the drag exerted thereon by the wire 50. The wire 50 produces drag on the end portion 390 since braking force is exerted on the spool source, not shown. Hence as the wire carrier 54 is extended, the wire 50 is drawn from its source but the drag exerted by the wire serves to displace the end portion 390 of the wire carrier from the path A to the path B.

Figure 27:
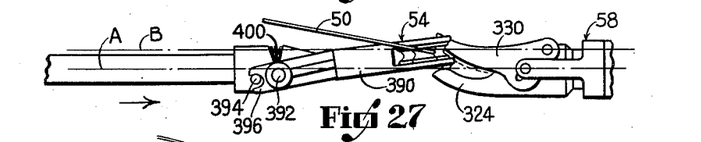
Fig. 27 is a side elevational view, corresponding to Fig. 26, and showing the disposition of the wire carrier means after such means has been extended to the wire twisting hooks.

When the end portion 390 is traveling along path B the wire 50, which extends between the spools 360 and 361, will be forced against the finger portion 330 on wire twisting hook 58 as is shown in Fig. 27. When the wire is extended against finger portion 330, such portion will be cammed upwardly as seen in Fig. 27. This causes the hook 58 to open by operation of the hook mechanism previously described.

When the wire carrier 54 has been extended past the position of Fig. 27, the wire carrier will be retracted causing wire 50 to go slack. The end portion 390 will then be returned to its normal position in path A due to the compression force of the spring 400. Hook 58 will close and retain wire 50 since the wire will no longer be exerting force on the finger portion 330 of the hook 58.

Figure 28:
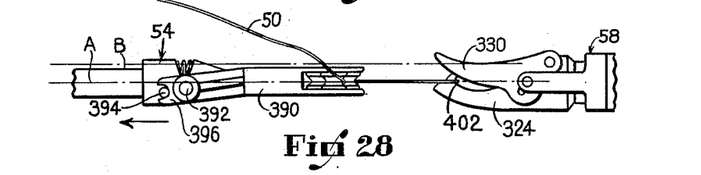
Fig. 28 is a side elevational view, corresponding to Figs. 26 and 27, and showing the disposition of the wire carrier means as such means is being retracted away from the wire twisting hooks.

Upon further retraction of the wire carrier 54, the wire 50 will be drawn taut between the end portion 390 of the wire carrier and the apex 402 of the opening through the hook 58. It will be noted that the portion of the wire to be twisted is thereby disposed along path A which is coincident with the axis of rotation of the wire twisting hook 58. The apparatus is now in proper configuration for applying straight line twisting action to the wire for forming the loops thereon. Hence it will be seen that the yieldable end portion on the wire carrier is shifted from path A to path B, upon extension, for causing the wire to engage the finger portions on the hooks for opening same. Upon retraction of the wire carrier, the yieldable end portion is shifted from path B back to path A so that straight line twisting action can be applied to the wire upon twisting of the wire twisting hooks.

While the form of embodiment of the present invention as herein disclosed constitutes a preferred form, it is to be understood that other forms might be adopted, all coming within the scope of the claims which follow.

I claim:

1. The steps in the method of tying binding wires for bales produce in a steady flow process, which comprises forming a loop on the end of a strand of wire; positioning said loop at a wire tying station adjacent the bale; surrounding the material to be baled by the wire; positioning a portion of the wire strand after surrounding said material at said tying station; twisting said loop and strand portion into a double loop; twisting a second portion of said wire strand adjacent to said first mentioned portion to form a second loop; severing the wire strand between said double loop and said second loop; and moving said double loop out of said tying station and said second loop into said tying station.

2. Wire tying mechanism, comprising a rotatable head, two rotatable hooks mounted on the head eccentric to the axis of rotation of the head, wire cutting means mounted on the mechanism and disposed intermediate the hooks, means movable towards and away from the head for placing a wire through the hooks, means for rotating said hooks relative to said head when one of said hooks is located at a wire pick-up station and the other of said hooks is located at a wire tying station; and means for rotating said head to move said one hook to said wire tying station and said other hook to said wire pick-up station.

3. Wire tying mechanism, comprising a rotatable head, two rotatable hooks mounted on the head eccentric to the axis of rotation of the head, a spring pressed latch for each of the hooks, wire cutting means mounted on the mechanism and disposed intermediate the hooks, means movable towards and away from the head for placing a wire through the hooks, means for rotating said hooks relative to said head when one of said hooks is located at a wire pick-up station and the other of said hooks is located at a wire tying station; and means for rotating said head to move said one hook to said wire tying station and said other hook to said wire pick-up station.

4. Wire tying mechanism, comprising a rotatable head, two rotatable hooks mounted on the head eccentric to the axis of rotation of the head, a shaft extending through the head and coaxial therewith, wire cutting means mounted on the shaft, a housing for the cutting means mounted on the head, means movable towards and away from the head for placing a wire through the hooks, means for rotating said hooks relative to said head when one of said hooks is located at a wire pick-up station and the other of said hooks is located at a wire tying station; and means for rotating said head to move said one hook to said wire tying station and said other hook to said wire pick-up station.

5. Wire tying mechanism, comprising a rotatable head, two rotatable hooks mounted on the head eccentric to the axis of rotation of the head, a shaft extending through the head and coaxial therewith, wire cutting means mounted on the shaft, a housing for the cutting means having wire receiving grooves in one end thereof, with said housing being mounted on the head and rotatable therewith relative to the cutting means, means movable towards and away from the head for placing a wire through the hooks, means for rotating said hooks relative to said head when one of said hooks is located at a wire pick-up station and the other of said hooks is located at a wire tying station; and means for rotating said head to move said one hook to said wire tying station and said other hook to said wire pick-up station.

6. Wire tying mechanism, comprising a rotatable head, two rotatable hooks mounted on the head eccentric to the axis of rotation of the head, means extending through the head intermediate the hooks and mounted stationary relative to rotation of the head with the means including a wire cutting portion, a housing for the cutting portion adapted for rotation with the head, with the means and housing being slidable relative to the hooks, and means movable towards and away from the head for placing a wire through the hooks.

7. Wire tying mechanism comprising two rotatable hooks disposed in spaced relationship in the mechanism and having substantially parallel axes of rotation, means for rotating the hooks about their respective axes when one of said hooks is located at a wire pick-up station and the other of said hooks is located at a wire tying station, wire cutting means intermediate the hooks, means movable towards and away from the hooks for placing a wire therethrough, means for moving said one hook to said wire tying station and said other hook to said wire pick-up station, and means for rotating the hooks about their respective axes after said movement of said hooks between said stations.

8. Wire tying mechanism comprising two spring pressed latches disposed in spaced relationship in the mechanism, with the latches being rotatable about respective axes in substantially parallel disposition and with the latches being rotatable as a unit about a common intermediately disposed axis, means for rotating the latches about the respective axes thereof when one of said latches is located at a wire pick-up station and the other of said latches is located at a wire tying station, means for rotating the latches as a unit about the common axis to interchange the location of said two latches at said stations, and means for opening the spring pressed latches at a predetermined position of rotation about the common axis.

9. Wire tying mechanism comprising a rotatable head, two spring pressed latches disposed in spaced relationship on said head, with the latches being rotatable about respective axes in substantially parallel disposition and with said head and latches being rotatable as a unit about a common axis, means for rotating the latches about the respective axes thereof, means for rotating the latches as a unit about the common axis, and a plunger and cam carried by said head and operatively responsive to said last mentioned means for opening the spring pressed latches.

10. Wire tying mechanism comprising two rotatable hooks disposed in spaced relationship in the mechanism and having substantially parallel axes of rotation, means for rotating the hooks about their respective axes, means for rotating both hooks as a unit about a common axis intermediate the hooks, wire cutting means intermediate the hooks, means movable towards and away from the hooks for placing a wire through the hooks, and a wire carrier portion mounted on said last mentioned means and yieldable in a direction substantially perpendicular to the path of movement of the means.

11. Wire tying mechanism comprising two rotatable hooks disposed in spaced relationship in the mechanism and having substantially parallel axes of rotation, a wire engaging portion on each of the hooks along the axis of rotation thereof, a spring pressed latch on each of the hooks, means for rotating the hooks about their respective axes, means for rotating both the hooks as a unit about a common axis intermediate the hooks, wire carrier means movable towards and away from the hooks for placing a wire through the hooks, a wire engaging portion mounted on said wire carrier means and normally disposed in a plane defined by the axes of rotation of the hooks, and such portion being yieldable to a path outside said plane whereby a wire is placed in the hooks through the latches upon movement of the wire carrier means, and means responsive to movement of the wire carrier means towards the hooks for moving the wire receiving portion from the plane to the path.

12. Wire tying mechanism comprising two rotatable hooks disposed in spaced relationship in the mechanism and having substantially parallel axes of rotation, a wire engaging portion on each of the hooks along the axis of rotation thereof, a spring pressed latch on each of the hooks, means for rotating the hooks about their respective axes, means for rotating both the hooks as a unit about a common axis intermediate the hooks, a wire dispenser in the mechanism, wire carrier means, movable towards and away from the hooks for placing a wire from the dispenser through the hooks, a wire engaging portion mounted on said wire carrier means and normally disposed in a plane defined by the axes of rotation of the hooks and yieldable, responsive to drag of the wire leaving the dispenser, to a path outside said plane whereby the wire is placed in the hooks through the latches upon movement of the wire carrier means towards the hooks.

13. In a wire tying apparatus for tying the ends of wires together by twisting one about the other, and wherein a twister means is coupled to a driving means, novel mechanism for coupling the twister means to the drive means, which mechanism comprises; a clutch mechanism between the driving means and the twisting means, said clutch comprising a portion directly rotated by the driving means, a second portion connectable with the first mentioned portion for rotation therewith, means constantly urging connection of the portions, a latching element on one of said portions; clutch releasing apparatus comprising a latching element mounted on the frame and engageable with the first mentioned latching element for retaining the clutch portions in disconnected disposition; a toggle connection between the second mentioned latching element and the frame, means constantly urging the toggle connection to an off-center position, a stop for retaining the toggle connection in said position, and means for moving the toggle connection from said position and past center to affect disengagement of the latching element.

14. In a wire tying apparatus for tying the ends of wires together by twisting one about the other, and wherein a twister means is coupled to a driving means, novel mechanism for coupling the twister means to the drive means, which mechanism comprises; a clutch mechanism between the driving means and the twisting means, said clutch comprising a portion directly rotated by the driving means, a second portion connectable with the first mentioned portion for rotation therewith, means constantly urging connection of the portions, a latching element on one of said portions; clutch releasing apparatus comprising a latching element mounted on the frame and engageable with the first mentioned latching element for retaining the clutch portions in disconnected disposition; a toggle connection between the second mentioned latching element and the frame means constantly urging the toggle connection to an off-center position, a stop for retaining the toggle connection in said position, a member movably mounted on the frame, a latching element on the member, a latching element on the toggle connection intermediate the ends thereof, means for moving the member thereby effecting movement of the toggle connection from said position and past center to disengage the first mentioned latching elements; and means for disengaging the second mentioned latching elements.

15. In a wire tying apparatus for tying the ends of wires together by twisting one about the other, and wherein a twister means is coupled to a driving means, novel mechanism for coupling the twister means to the drive means, which mechanism comprises; a clutch mechanism between the driving means and the twisting means, said clutch comprising a portion directly rotated by the driving means, a second portion connectable with the first mentioned portion for rotation therewith, means constantly urging connection of the portions, a latching element on one of said portions; clutch releasing apparatus comprising a latching element mounted on the frame and engageable with the first mentioned latching element for retaining the clutch portions in disconnected disposition; a toggle connection between the second mentioned latching element and the frame, means constantly urging the toggle connection to an off-center position, a stop for retaining the toggle connection in said position, a member movably mounted on the frame, a latching element on the member, a latching element on the toggle connection intermediate the ends thereof, means for moving the member thereby effecting movement of the toggle connection from said position and past center to disengage the first mentioned latching elements; and means for disengaging the second mentioned latching elements comprising a cam on one of said elements, a cam on the second mentioned clutch portion for engaging the first mentioned cam upon rotation of said clutch portion.

16. In a wire tying apparatus for tying the ends of wires together by twisting one about the other, and wherein a twister means is coupled to a driving means, novel mechanism for coupling the twister means to the drive means, which mechanism comprises; a clutch mechanism between the driving means and the twisting means, said clutch comprising a portion directly rotated by the driving means, a second portion connectable with the first mentioned portion for rotation therewith, a plurality of dogs pivotally mounted on one of the portions, an actuating bar pivotally mounted on said portion for actuating the dogs, a latch element on the actuating bar, socket means on the other of the portions for engaging the dogs, means constantly urging the dogs towards engagement with the socket means; clutch releasing apparatus comprising a latching element mounted on the frame and engageable with the first mentioned latching element for retaining the clutch portions in disconnected disposition; a toggle connection between the second mentioned latching element and the frame, means constantly urging the toggle connection to an off center position, a stop for retaining the toggle connection in said position, and means for moving the toggle connection from said position and past center to affect disengagement of the latching element.

17. Wire tying mechanism, comprising a frame, a head rotatably mounted on the frame, two rotatable hooks mounted on the head eccentric to the axis of rotation of the head, driving means for the mechanism, hook rotating means driven by the driving means for intermittently rotating the hooks about their respective axes when one of said hooks is located at a wire pick-up station and the other of said hooks is located at a wire tying station, means for rotating said head to interchange the positions of said two hooks in said two stations, means for placing a wire length through said two hooks and extended between said two stations, wire cutting means located intermediate said two hooks and including a severing element carried by said frame and a severing element carried by said head, whereby rotation of said head imparts relative motion between said two severing elements.

18. Wire tying mechanism, comprising a frame, a head rotatably mounted on the frame, two rotatable hooks mounted on the head eccentric to the axis of rotation of the head, driving means for the mechanism, hook rotating means driven by the driving means for intermittently rotating the hooks about their respective axes said hook rotating means comprising a shaft mounted to the frame and rotated by the driving means, a gear segment mounted on the shaft, a slide mounted on the shaft, a second shaft mounted on the frame, a gear mounted on the second shaft and driven by the gear segment, and an element on the second shaft and intermittently engageable with the slide for locking the second shaft against rotation.

19. Wire tying mechanism, comprising a frame, a head rotatably mounted on the frame, two rotatable hooks mounted on the head eccentric to the axis of rotation of the head, driving means for the mechanism, and head rotating means driven by the driving means for intermittently rotating the head about its axis of rotation, said head rotating means comprising a shaft mounted to the frame and rotated by the driving means, a gear segment mounted on the shaft, a slide mounted on the shaft, a second shaft mounted on the frame, a gear mounted on the second shaft and driven by the gear segment, and an element on the second shaft and intermittently engageable with the slide for locking the second shaft against rotation.

20. Wire tying mechanism, comprising a rotatable head, two rotatable hooks mounted on the head eccentric to the axis of the head, a wire cutter intermediate the hooks and mounted stationary relative to rotation of the head, a housing for the wire cutter adapted to receive and rotate a wire relative to the cutter, driving means for the mechanism, and means driven by the driving means for intermittently rotating the head and the housing.

21. Wire tying mechanism, comprising a wire twisting hook adapted to be opened and closed, driving means for the mechanism, hook actuating apparatus comprising a cam element, a follower element engageable with the cam element, with one of said elements being driven by the driving means and with the other of said elements being operatively associated with the hook.

22. Wire tying mechanism, comprising a rotatable head, two rotatable hooks mounted on the head eccentric to the axis of rotation of the head, said hooks being adapted to be opened and closed, driving means for the mechanism, means driven by said driving means for rotating said hooks relative to said head when one of said hooks is located at a wire pick-up station and the other of said hooks is located at wire tying station, head rotating means driven by the driving means for intermittently rotating the head about its axis of rotation to interchange the locations of said hooks in said stations, and hook actuating means responsive to rotation of the head for opening each hook at a predetermined position of rotation of the head.

23. Wire tying mechanism comprising two rotatable hooks disposed in spaced relationship in the mechanism and having substantially parallel axes of rotation, wire cutting means intermediate the hooks, said means being extendible and retractable relative to the hooks along an axis substantially parallel to said axes of rotation, driving means for the mechanism, and apparatus driven by the driving means for intermittently extending and retracting the wire cutting means.

24. Wire tying mechanism comprising a frame, two rotatable hooks disposed in spaced relationship in the mechanism and having substantially parallel axes of rotation, wire cutting means intermediate the hooks, said means being extendible and retractable relative to the hooks along an axis substantially parallel to said axes of rotation, driving means for the mechanism, and apparatus driven by the driving means for intermittently extending and retracting the wire cutting means, said apparatus comprising a bracket slidably mounted on the frame, a member having one end mounted to the bracket and the other end carrying the wire cutting means, a cam rotated by the driving means, a shaft mounted on the frame, an arm and follower mounted on the shaft and in engagement with the cam, a second arm mounted on the shaft and operatively associated with the bracket for slidably moving same.

25. Wire tying mechanism comprising two rotatable hooks disposed in spaced relationship in the mechanism, wire cutting means intermediate the hooks and extendible and retractable relative thereto, wire carrier means spaced from the hooks and extendible and retractable relative thereto for placing a wire through the hooks, driving means for the mechanism, apparatus driven by the driving means for extending and retracting both the wire cutting means and the wire carrier means, said apparatus being adapted to retract the wire cutting means as the wire carrier means is extended toward the hooks.

26. Wire tying mechanism, comprising a frame; wire twisting means mounted on the frame; wire carrying means mounted on the frame, with one of said means being extendible and retractable relative to the other of said means along a path of movement thereof, and a wire shifting element engageable with a wire portion, said portion being secured to said twisting means and extending along a portion of said path and around material being bound by said mechanism, said element being transversely moveable relative to the direction of said path for engaging and shifting a wire out of said path to permit said wire carrying means to place a second wire portion in said twisting means without interference from said first wire portion secured to said twisting means.

27. Wire tying mechanism, comprising a frame; wire twisting means mounted on the frame; wire carrying means mounted on the frame, with one of said means being extendible and retractable relative to the other of said means along a path of movement thereof; a wire shifting element mounted on the frame and transversely moveable relative to the direction of the said path, said element including a wire engaging portion for engaging and shifting a wire out of said path upon movement of the element in one direction, said portion being yieldable responsive to contact of a second wire upon movement of the element in the opposite direction.

References Cited in the file of this patent

UNITED STATES PATENTS

| | | |
|---|---|---|
| 777,474 | Jones et al. | Dec. 13, 1904 |
| 1,404,447 | Koontz | Jan. 24, 1922 |
| 2,413,378 | Raney | Dec. 31, 1946 |
| 2,516,742 | Adkisson | July 25, 1950 |
| 2,560,143 | Vietti | July 10, 1951 |
| 2,610,573 | Altgelt | Sept. 16, 1952 |
| 2,612,099 | McClellan et al. | Sept. 30, 1952 |

FOREIGN PATENTS

| | | |
|---|---|---|
| 121,416 | Australia | May 16, 1946 |